June 27, 1950     P. YOUNG     2,512,987

VALVE STOP

Filed March 22, 1948

Inventor:
Philippe Young
By *[signature]*
Attorney

Patented June 27, 1950

2,512,987

UNITED STATES PATENT OFFICE 2,512,987

VALVE STOP

Philippe Young, Trois-Rivieres, Quebec, Canada

Application March 22, 1948, Serial No. 16,381
In Canada September 22, 1947

4 Claims. (Cl. 74—526)

The present invention pertains to a novel valve stop that is useful particularly in connection with liquid fuel burners.

In such an installation, the valve is set for a given rate of flow over an extended period of time, with interruptions effected by the thermostat. The principal object of this invention is to provide a means that prevents opening the valve beyond the desired maximum, either accidentally or with intent. A further object is to provide such a device that is easily set to the desired position. Still another object is to provide a device of the character described that is relatively simple, effective, and inexpensive in construction.

In the accomplishment of these objects, the device includes a clamp adapted to be secured to the usual indicator plate that surrounds the valve stem. The clamp itself carries a stop member designed to rest on the indicator plate at the selected position. The valve handle carries an extension that will abut the stop member and prevent opening of the valve beyond the selected position.

In the preferred embodiment, the clamp consists of two clamp plates mounted on a bolt. The stop member is a slotted piece also mounted on the bolt and having a bent end that serves as the abutment.

The invention is fully disclosed by way of example in the following description and in the accompanying drawings in which.

References to these views will now be made by use of like characters which are employed to designate corresponding parts throughout.

Figure 3:
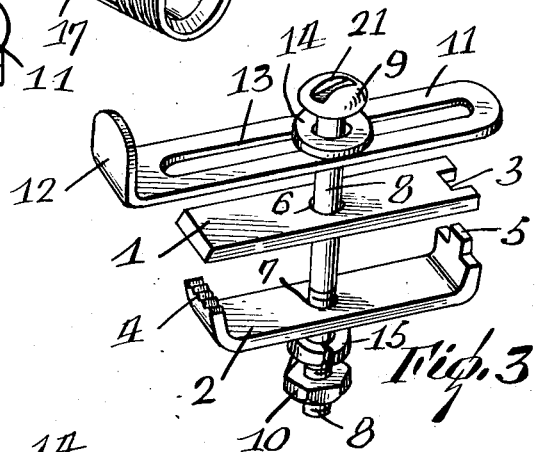
Figure 3 is a perspective view of the device of the invention, the parts being spaced.
Figure 4:
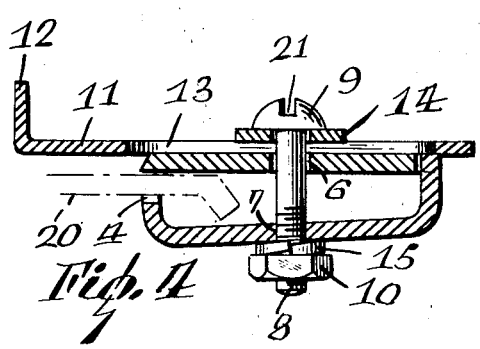
Figure 4 is a central longitudinal section thereof.

As already indicated, the device of the invention includes a clamp comprising a pair of plates 1 and 2, the former being notched at 3 at one end, and the latter being bent upwardly at both ends as shown in Figures 3 and 4. One of the bent ends is toothed or serrated at 4, and the other is formed with a single tooth or lug 5 adapted to enter the notch 3. The plates 1 and 2 are centrally apertured at 6 and 7 for the passage of a bolt 8 formed at one end with a round head 9 and fitted at its threaded end with a nut 10. The bolt 8 further carries a slotted slide 11 bent upward at one end at 12 and slotted lengthwise at 13 for its sliding movement on the bolt. The slide lies above the plate 1, and between the slide and the head 9 of the bolt is a washer 14. A split ring 15 is mounted on the bolt between the plate 2 and the nut 10.

Figure 1:
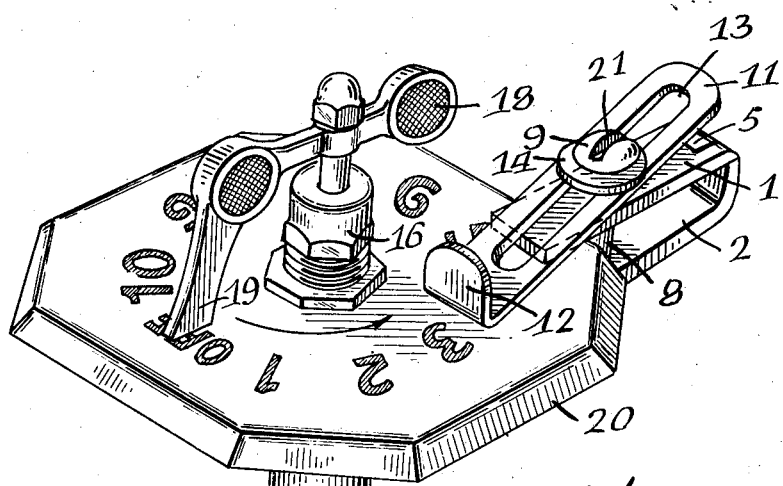
Figure 1 is a perspective view illustrating the use of the invention.
Figure 2:
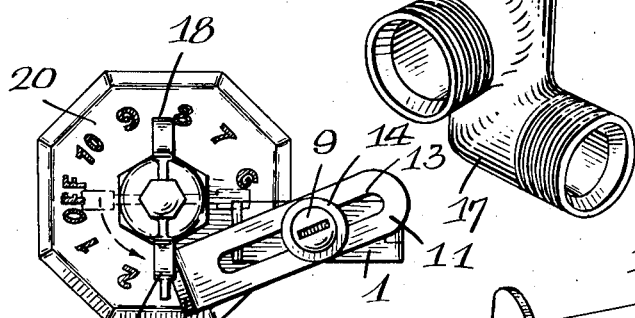
Figure 2 is a corresponding plan view.

In Figures 1 and 2 is shown a valve plug 16 controlling a pipe 17 and fitted at its exposed end with a handle 18. An extension 19 from one end of the handle cooperates with numerals on an indicator plate 20 secured on the pipe 17. Between the ends of the series of numerals the plate 20 carries the word "Off" for a purpose that will presently appear.

In the use of the device, the plates 1 and 2 are clamped on opposite surfaces of the plate 20 by tightening the nut 10 on the bolt 8. The head 9 of the bolt and the slide 11 also become clamped upon the plate 1. The serrated edge 4 bends on the lower surface of the plate 20, and the clamp is balanced by the reception of the lug 5 in the recess 3.

Before tightening the assembly, the bent end 12 of the slide 11 is adjusted to the position where it is to act as a stop for the extension 19. The tightening of the assembly may be accomplished by inserting a screw driver in the slot 21 of the bolt head 9 while holding the nut 10 with a pair of pliers.

The adjusted position of the stop 12 represents the desired maximum valve opening for a considerable length of time, as in the case of the oil line and an oil burner. The handle can freely be turned in the closing direction to the "Off" position which it will not pass because of conventional structure within the valve. In the opening direction, however, the extension 19 cannot pass the stop 12 either by accident or by deliberate movement.

It is apparent that the device can be attached easily and readily at any position on the plate 20 to permit setting the stop 12 at any selection numeral on the plate.

Although a specific embodiment of the invention has been illustrated and described, it will be understood that various alterations in the details of construction may be made without departing from the scope of the invention as indicated by the appended claims.

What I claim as my invention is:

1. A valve stop comprising a headed bolt and a nut, a pair of clamp plates slidable on and lengthwise of said bolt, said plates being rigid for a substantial distance from said bolt, and adapted for attachment to opposite sides of an indicator plate, and a rigid, lengthwise slotted stop member slidably mounted on said bolt at the outer surface of one of said clamp plates and beneath the head of said bolt.

2. A valve stop comprising a headed bolt and a nut, a pair of clamp plates slidable on and lengthwise of said bolt, said plates being rigid for a substantial distance from said bolt, and adapted for attachment to opposite sides of an indicator plate, and a rigid, lengthwise slotted stop member slidably mounted on said bolt at the outer surface of one of said clamp plates and beneath the head of said bolt, said member having a bent end serving as an abutment piece.

3. A valve stop comprising a headed bolt and a nut, a pair of clamp plates slidable on and lengthwise of said bolt, said plates being rigid for a substantial distance from said bolt, and adapted for attachment to opposite sides of an indicator plate, and a rigid stop member slidably mounted on said bolt lengthwise thereof at the outer surface of one of said clamp plates and beneath the head of said bolt, said member being slotted lengthwise to receive said bolt and to permit sliding adjustment of the member, and separable, mutually interlocking means at one end of each of said plates.

4. A valve stop comprising a headed bolt and a nut, a pair of clamp plates slidable on and lengthwise of said bolt, said plates being rigid for a substantial distance from said bolt, and adapted for attachment to opposite sides of an indicator plate, and a rigid stop member slidably mounted on said bolt lengthwise thereof at the outer surface of one of said clamp plates and beneath the head of said bolt, said member having a bent end serving as an abutment piece, said member being slotted lengthwise to receive said bolt and to permit sliding adjustment of the member, and separable, mutually interlocking means at one end of each of said plates.

PHILIPPE YOUNG.

REFERENCES CITED

The following references are of record in the file of this patent:

UNITED STATES PATENTS

| Number | Name | Date |
|---|---|---|
| 306,344 | Morgan | Oct. 7, 1884 |
| 670,326 | Mullen | Mar. 19, 1907 |
| 1,360,894 | Cowles | Nov. 30, 1920 |
| 1,423,627 | Sherman | July 25, 1922 |
| 2,349,742 | Macavoy | Nov. 23, 1944 |